United States Patent Office 2,830,850
Patented Apr. 15, 1958

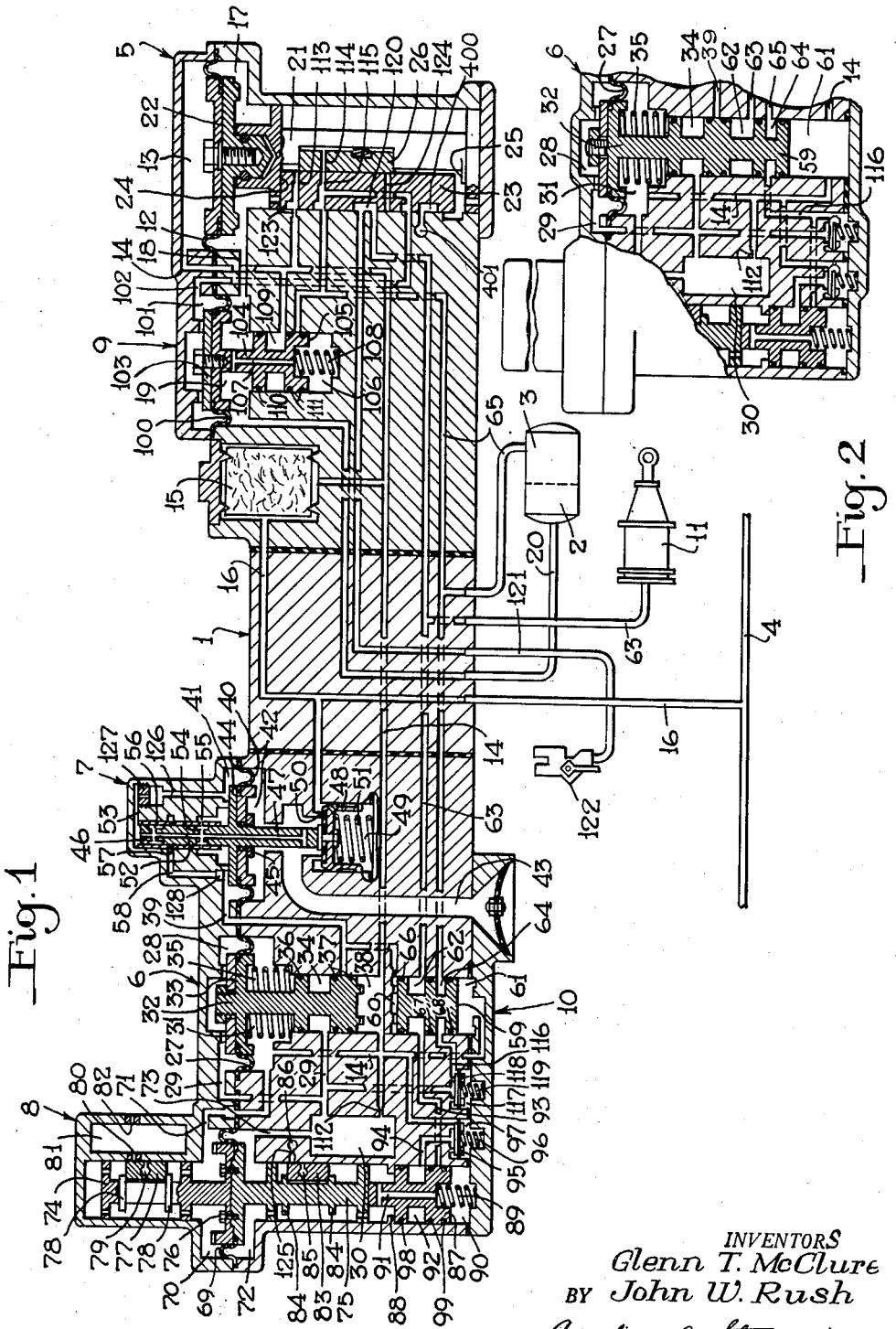

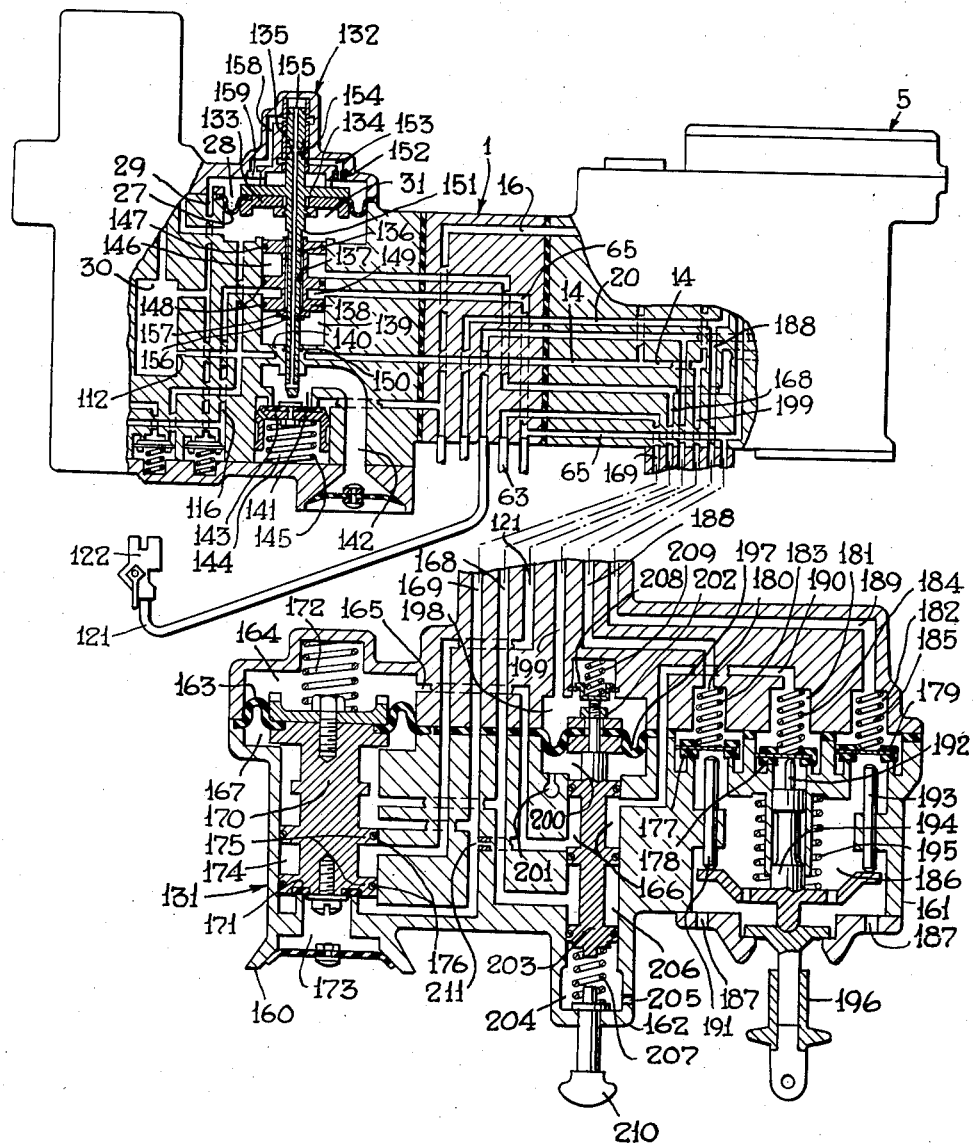

2,830,850

FLUID PRESSURE BRAKE APPARATUS

Glenn T. McClure, McKeesport, and John W. Rush, Pittsburgh, Pa., assignors to Westinghouse Air Brake Company, Wilmerding, Pa., a corporation of Pennsylvania Application April 28, 1955, Serial No. 504,601

12 Claims. (Cl. 303—35)

This invention relates to fluid pressure brake apparatus of the automatic type for railway vehicles, and more particularly to brake equipment of the type operative upon a reduction in brake pipe pressure at a service rate to connect an auxiliary reservoir to a brake cylinder device to effect a service application of the vehicle brakes and upon a reduction in brake pipe pressure at an emergency rate to connect an emergency reservoir in addition to said brake cylinder device to effect an emergency application of the vehicle brakes, and upon a restoration in brake pipe pressure to effect a release of the vehicle brakes and recharge the equipment.

While the aforesaid functions are to be found in the well-known "AB" type of freight brake equipment as described in Instruction Pamphlet No. 5062, published in March 1941 by The Westinghouse Air Brake Company, Wilmerding, Pa., this invention provides in addition to improved means for obtaining an emergency application of the brakes, a novel combined breather valve device for venting brake pipe and an emergency quick action chamber simultaneously by operation of one diaphragm to obtain greater stability against undesired emergency applications, a novel accelerated release means for connecting emergency reservoir to brake pipe immediately upon movement of the service valve mechanism to release position after a brake application has been effected for propagation of a brake release through the train, and an improved manually operable release and reapplication valve device for conserving reservoir pressure in the equipment while obtaining an independent release and reapplication of the brakes.

The principal object of the invention is to provide an improved brake equipment of the above type.

Another object of the invention is to provide in a brake equipment of the above type an improved emergency application valve means having an emergency stabilizing breather valve acting in unison with a quick service valve operation under the control of a common diaphragm whereby undesired emergency operation will be rendered less likely.

Another object is to provide in a brake equipment of the above type valve means operative, in conjunction with the operation of a service application valve means to effect a release of the brakes, to discharge fluid under pressure into the train brake pipe to thereby accelerate the propagation of a brake release through the train.

Another object is to provide an improved brake release and reapplication valve device for use in conjunction with a brake equipment of the above type for releasing fluid under pressure from a brake cylinder device to release the brakes on a car with the brake pipe fully vented and without losing the fluid pressure still remaining in the storage reservoirs and for reapplying the brakes by supplying fluid under pressure thus retained in said reservoirs to said brake cylinder device.

Another object is to provide an improved release valve device for use in conjunction with the brake equipment of the above type which may not be operated as long as the brake pipe is charged with fluid under pressure so as to prevent tampering with the brakes while the car is in an operative train.

Other objects and advantages will become apparent from the following more detailed description of the invention.

In the accompanying drawings, Fig. 1 is a diagrammatic view, chiefly in section, of a fluid pressure brake apparatus embodying the invention, Fig. 2 is a diagrammatic view of a modification of a portion of Fig. 1, and, Fig. 3 is a diagrammatic view of another modification of a portion of Fig. 1 with the addition of a diagrammatic view of release and reapplication valve means.

As shown in the accompanying drawings, the improved fluid pressure brake apparatus comprises a brake controlling valve device 1, auxiliary reservoir 2, emergency reservoir 3, a brake pipe 4, a service application valve device 5, an emergency application valve device 6, a vent valve device 7, a combined quick service and quick action chamber breather valve device 8, an accelerated service release valve device 9, a high pressure valve device 10 and a brake cylinder device 11.

The service application valve device 5 comprises a flexible diaphragm 12 clamped about its peripheral edge in the casing of the device. At one side of the diaphragm 12 is a control chamber 13 which is open to the brake pipe 4 by way of a passage 14, a strainer 15 and a passage and pipe 16. At the opposite side of diaphragm 12 is a valve chamber 17 which is in constant communication with the auxiliary reservoir 2 by way of a passage 18, a chamber 19 in valve device 9, and a passage and pipe 20. A stem 21 slidably mounted in the casing within valve chamber 17 is secured at one end to the center of the diaphragm 12 by conventional clamping means 22 for movement with said diaphragm. A main slide valve 23 contained in chamber 17 and arranged to slide on a seat in the casing is mounted with a certain degree of lost motion between a shoulder 24 on stem 21 adjacent the diaphragm 12 and a shoulder 25 formed on said stem adjacent its opposite end. An auxiliary slide valve 26 slidably mounted on a seat provided on the main slide valve 23 is disposed in a recess in the stem 21 for movement therewith.

The emergency application valve device comprises a flexible diaphragm 27 clamped about its peripheral edge in the casing and having at one side a chamber 28 which is opened by way of a passage 29 to a quick action chamber 30. At the opposite side of diaphragm 27 is a valve chamber 31 which is in constant communication with the brake pipe 4 by way of passage 14. A follower stem 32 is slidably mounted in chamber 31 and is secured by suitable clamping means 33 to the center of diaphragm 27 for operation thereby. Formed about the stem 32 is an annular cavity 34 which is connected to quick action chamber 30 by way of passage 29 when the stem is in its normal uppermost position to which it is urged by a spring 35 contained in chamber 31, as shown in Fig. 1 of the drawings. An annular sealing ring 36 is mounted in the periphery of the stem 32 for preventing leakage of fluid under pressure between cavity 34 and chamber 31. A pair of sealing rings 37 are similarly mounted in the lower end of stem 32 to prevent leakage between cavity 34 and a chamber 38 at the lower end of stem 32, which chamber is open to brake pipe passage 14. The sealing rings 37 are arranged to bracket a passage 39 leading to the vent valve device 7, thereby preventing leakage of fluid under pressure from either cavity 34 or chamber 38 to said passage when the stem 32 which is in its normal position shown. As will appear more fully later, cavity 34 and passages 29 and 39 serve to connect quick action chamber 30 to the vent valve device 7 when diaphragm 27 is operated to its emergency position.

The vent valve device 7 comprises a flexible diaphragm 40 clamped about its periphery between sections on the casing and having at one side a chamber 41 which is opened to passage 39 and at the other side a chamber 42 which is opened to atmosphere by way of vent passage 43. A follower 44, secured by conventional clamping means 45 to the center of diaphragm 40, is provided at its upper side with a stem 46 extending through chamber 41 and slidably guided in a suitable bore in the casing, and provided at its lower end with a stem 47 extending through chamber 42. The lower stem 47 is provided with a vent valve 48 contained in a chamber 49 which is always open to brake pipe passage 16. The vent valve 48 is urged towards seating engagement with a seating rib 50 by a spring 51 contained in chamber 49. The follower 44 is provided with a longitudinal passage 52 which connects a chamber and passage 53 at the upper end of the follower with atmospheric chamber 42 and vent passage 43 at its lower end. This passage 52 is connected with an annular cavity 54 which is normally connected to chamber 41 through a port 55, and also an annular cavity 56 which may, during a brake pipe venting operation, register with a port 57 connecting the chamber 41 to a passage 58 leading to chamber 41. For reasons which will appear more fully later, passage 58 may have a smaller flow capacity than that of port 55.

The high pressure valve 10 comprises a piston valve 59 slidably mounted in a suitable bore in the casing and having at its upper side a chamber 60 open to passage 39 and at its lower side a chamber 61 which is open to a branch of brake pipe passage 14. Intermediate its ends the piston valve 59 is provided with an annular cavity 62 which is normally connected to brake cylinder 11 by way of a passage and pipe 63. The piston valve 59 is further provided with an annular cavity 64 which is normally connected to the emergency reservoir 3 by way of a passage and pipe 65. The piston valve 59 is further provided with a sealing ring 66 for preventing leakage of fluid under pressure between chamber 62 and passage 39, a sealing ring 67 for preventing leakage of fluid under pressure between chambers 62 and 64, and a sealing ring 68 for preventing leakage of fluid under pressure between chambers 64 and 61.

The combined quick service and quick action chamber breather valve device 8 comprises a diaphragm 69 clamped by its periphery between two sections of the casing and dividing said casing into a chamber 70, which is connected to chamber 31 by way of a passage 71, and a chamber 72 which is connected to quick action chamber 30 through a passage 73. Follower stems 74 and 75 are secured by screw-thread means 76 in clamping relation to the center of diaphragm 69 in such a manner as to extend into chambers 70 and 72, respectively. In chamber 70 a quick service slide valve 77 is slidably mounted on a valve seat formed in the casing and is disposed between a pair of annular ribs 78 formed on the stem 74 for operation with movement of diaphragm 69. The slide valve 77 is provided with a port 79 which is arranged to register, upon upward movement of diaphragm 69 in response to a reduction in brake pipe pressure in chamber 70, with a port 80 in the valve seat to thereby connect chamber 70 to a quick service volume or reservoir 81 which is open to atmosphere through a vent choke 82. Similarly, a slide valve 83 is operably mounted in chamber 72 between two annular ribs 84 formed on stem 75 so that upon movement of diaphragm 69 to a quick service position in which port 79 registers with port 80, a port 85 in slide valve 83 will register with a vent port 86 to thereby reduce quick action chamber at a rate compatible with a service rate of reduction of brake pipe pressure. A piston valve 87, which serves as a backdump valve during a release of an emergency application, is slidably mounted in the casing and held in an abutting engagement with an annular shoulder 88 formed in said casing by a spring 89 contained in a chamber 90, which chamber is connected to chamber 72 by way of a longitudinal passage 91 formed in said piston valve. An annular cavity 92 is formed in piston valve 87 intermediate its ends, which cavity is adapted to connect said passage 93 leading from high pressure valve 10 to another backdump passage 94 leading to the seated area of a backdump check valve 95 urged toward its seating position by a spring 96 contained in a chamber 97 which is open to brake pipe passage 14. The piston valve 87 is further provided with a sealing ring 98 for preventing leakage of fluid under pressure between cavity 92 and chamber 72 and a pair of sealing rings 99 which, when in a position in which they are shown in Fig. 1, bridging the mouth of passage 93 for preventing leakage of fluid under pressure from said passage to cavity 92 and chamber 90.

The accelerated service release valve device 9 comprises a flexible diaphragm 100 clamped between two sections of the casing and having at one side a diaphragm chamber 101 which is opened to the seat for the slide valve 23 in the service application valve device 5 by way of a passage 102 and having at the other side the chamber 19 which, as previously noted, is opened to auxiliary reservoir 2 by way of passage and pipe 20. Secured to the center of the flexible diaphragm 100 by suitable clamping means 103 is a follower stem 104 which terminates in a piston valve 105 having at its inner end a chamber 106 which is connected to chamber 19 by way of a longitudinal passage 107. Contained in chamber 106 is a spring 108 which urges the diaphragm follower 103 upwardly into contact with the casing, as shown in Fig. 1 of the drawings. An annular cavity 109 is formed intermediate ends of the piston valve 105, which cavity is opened to brake pipe passage 14 and, as will appear more fully later, may be connected to emergency reservoir passage 65, by downward movement of diaphragm 100 in response to pressure of fluid in chamber 101. The piston valve 105 is further provided with a sealing ring 110 for preventing leakage of fluid under pressure between annular cavity 109 and chamber 19 and also a pair of sealing rings 111 bracketing the mouth of passage 65 in the manner in which it is shown in Fig. 1 for preventing leakage of fluid under pressure from said passage to annular cavity 109 and to chamber 106.

*Operation.—Initial charging*

Let it be assumed that the brake apparatus is void of fluid under pressure and that the various parts thereof are in the positions in which they are shown in the drawing.

To initially charge the brake apparatus, fluid will be supplied to the brake pipe 4 and be increased in pressure to a degree such as 70 pounds which is a normal operating pressure for freight service. As fluid under pressure is thus supplied to the brake pipe 4, it will flow therefrom through branch pipe and passage 16, strainer 15, and passage 14 to control chamber 13 in the service application valve device 5 and to control chamber 31 in the emergency valve device 6, whence it will flow by way of passage 71 to chamber 70 in the combined quick service and quick action chamber breather valve device 8. Fluid under pressure thus supplied to passage 14 at brake pipe pressure will also flow to quick action chamber 30 by way of a charging choke 112, to chamber 38 in the emergency application valve device 6, to chamber 61 in the high pressure valve device 10, to vent valve chamber 49 in the vent valve device 7 and to chamber 109 on the accelerated service release valve device 9.

With the parts of the service application valve device 5 in their brake release position, in which they are shown in Fig. 1, a port 113 in the main service slide valve 23 registers at one end with the brake pipe passage 14 while the other end of said port is opened to valve chamber 17 past the upper end of the auxiliary slide valve 26, whereby fluid under pressure supplied from the brake pipe 4 will flow to said chamber and thence by way of passage 18, chamber 19 in the accelerated service release valve device 9, and passage and pipe 20 to the auxiliary reservoir 2 for charging said chambers and said reservoir. Fluid under pressure will also flow from valve chamber 17 through a restricted charging port 114 in the auxiliary slide valve 26 and a port 115 in the main slide valve 23 to passage and pipe 65 and to passage 102, whence it will flow to emergency reservoir 3 and to chamber 101 in accelerated service release valve device 9, respectively, and also, through cavity 64 in a high pressure valve device 10 and a passage 116, to a chamber 117. Simultaneous flow of fluid under pressure from the valve chamber 17 to chambers 19 and 101 in the accelerated service release valve device 9 at this time will not disturb the equilibrium of diaphragm 100 and the valve 105 therefore will remain in its cut-off position in which it is shown in the drawing with passage 14 disconnected from passage 65 via cavity 109. Flow of fluid under pressure from chamber 117 to quick action chamber passage 29 will be prevented by a spill-over check valve 118 contained in said chamber and pressed to its seated position by a spring 119 also contained in said chamber.

In the normal or release position of the main service slide valve 23 a cavity 120 therein establishes communication between brake cylinder passage 63 and a brake cylinder passage and pipe 121 leading to a retaining valve device 122, which may be of the type disclosed in Patent No. 2,204,796 issued on June 18, 1940, to C. C. Farmer, and which operates in the usual manner to either permit a direct release of fluid under pressure from brake cylinder device 11, or to limit the release of fluid under pressure from said brake cylinder device to a chosen degree as well known. Brake cylinder pressure in the brake cylinder device 11 will be vented to atmosphere by way of the brake cylinder pipe and passage 63, cavity 120, and passage and pipe 121 and retaining valve device 122.

Fluid at brake pipe pressure supplied to quick action chamber 30 from passage 14 by way of choke 112, as previously stated, will flow through passage 73 to chamber 72 in the combined quick service and quick action chamber breather valve device 8, where it will balance against brake pipe pressure in chamber 70 at the opposite side of diaphragm 69. Fluid under pressure thus supplied to quick action chamber 30 will also flow to chamber 28 in the emergency application valve device 6, where it will act on diaphragm 27 in opposition to brake pipe pressure in chamber 31. Fluid under pressure supplied to quick action chamber 30 will also flow by way of passage 29 to the seated area of spill-over check valve 119, which, in the event of quick action chamber becoming charged to a certain higher degree of pressure than emergency reservoir pressure at the other side of said check valve, as when a vehicle is near the head end of the train, will unseat the check valve and flow through passage and pipe 65 to emergency reservoir 3 to thereby prevent the emergency application valve device 6 from instituting an undesired emergency application. Thus when the brake apparatus becomes fully charged, the fluid pressures in chambers 28 and 72 will be substantially the same as brake pipe pressure acting on the opposite side of diaphragms 27 and 69, respectively.

*Service application of brakes*

If is now desired to effect a service application of the brakes, the pressure in the brake pipe 4 will be reduced at the usual service rate. A choke 123 will restrict back flow of fluid under pressure from the auxiliary reservoir 2 to the brake pipe 4 to such an extent that the brake pipe pressure in diaphragm chamber 13 of the service application valve device 5 will promptly reduce below auxiliary reservoir pressure on the opposite side of diaphragm 12 sufficiently, such as 1½ pounds, to produce a force on said diaphragm which will shift it and the auxiliary slide valve 26 upwardly relative to the main slide valve 23 in order to lap port 113 and thereby cut off back flow of fluid under pressure from the auxiliary reservoir 2 and valve chamber 17 to the brake pipe 4, and to port 115 for disconnecting the auxiliary reservoir 2 from the emergency reservoir 3. When the ports 113 and 115 are thus lapped, the shoulder 25 on the follower stem 21 will be in contact with the lower end of the main slide valve 23, which is pressed to its seat by auxiliary reservoir pressure in valve chamber pressure 17 and therefore offers a considerable resistance to movement.

It will be noted that the reduction in brake pipe pressure in passage 14 will become effective at the same time in chamber 70 of the combined quick service and quick action chamber breather valve device 8 and upon a reduction in fluid pressure of .3 to .5 pound, sufficient differential between quick action chamber pressure in chamber 72 and brake pipe pressure in chamber 70 will be established to move diaphragm 69 upward. Thus diaphragm 69 will deflect upwardly at substantially the same time as the upward movement of diaphragm 12 occurs. Diaphragm 69 will act through the medium of the follower stem 74 and annular rib 78 thereon to move the quick service slide valve 77 upwardly until port 79 therein registers with port 80 in the slide valve seat to thereby connect valve chamber 70 to quick service reservoir 81. Fluid under pressure in brake pipe 4 will then flow to branch pipe 16, strainer 15, passage 14, valve chamber 70, passage 79 and port 80 to quick service volume 81 until the fluid pressure therein is substantially equal to that in valve chamber 70 and brake pipe 4.

Diaphragm 69 will act through the medium of an annular rib 84 on follower stem 75 to move slide valve 83 upwardly so that port 85 in said slide valve will register with vent port 86 at substantially the same time as port 79 in quick service slide valve 77 registers with port 80. Thus, as fluid under pressure in chamber 70 is being discharged into quick service volume or reservoir 81, fluid under pressure in chamber 72 will be vented to atmosphere through port 86.

Now, when diaphragm 69 is deflected upwardly by the reduction in brake pipe pressure in chamber 70, the volume of chamber 72 is increased by the amount of displacement of said diaphragm, which, of course, will be product of the area times the distance moved. This increase in volume of chamber 72 will result in a decrease in pressure in said chamber, which, when combined with the reduction in quick action chamber pressure effected by the breather action of quick action chamber port 85, will be conductive to greater stability against, or resistance to, an undesired emergency application at the initiation of a brake pipe reduction, a time when such stability is most desirable. Since diaphragm 69 is directly connected to the quick service slide valve 77, the stabilizing effect of the reduction in quick action chamber pressure will be present even before the port 79 becomes active. Since the pressure of fluid in quick service reservoir 81 will become substantially equal to that in chamber 70, being diminished only by the amount vented through the choke 82, further reduction in brake pipe pressure will cause quick action chamber pressure to continue to be vented to atmosphere while quick service activity will be substantially reduced or terminated.

After this sudden, local, quick service reduction in brake pipe pressure has been effected by flow of fluid under pressure to the quick service reservoir 81, a sufficient reduction in brake pipe pressure below auxiliary reservoir pressure acting on opposite sides of the flexible diaphragm 12 will be obtained to cause said diaphragm to move the main slide valve 23 to a service position defined by engagement with the casing of a portion of the clamping means 22 disposed in chamber 13. The previously described upward movement of auxiliary slide valve 26 which had caused the charging ports 113 and 115 in the main slide valve 23 to be lapped will have also caused a service port 124 in the main slide valve to be uncovered by the auxiliary slide valve. As the main slide valve 23 is now moved upwardly, the service port 124 is cracked open to passage 63 to permit fluid under pressure from valve chamber 17 and the auxiliary reservoir 2 to flow through said port and thence through passage and pipe 63 to the brake cylinder device 11. At the same time, cavity 120 is disconnected from passage 63, thereby cutting off the connection of brake cylinder device 11 to the retaining valve device 122; passage 102 is disconnected from passage 115 and a cavity 400 in main slide valve 23 is brought into registry with passage 102 to vent chamber 101 in accelerated service release valve device 9 to the atmosphere via a vent port 401 for assuring, at this time, that valve 105 will remain in its cut-off position in which it is shown in the drawing during the effecting of a brake application. When the auxiliary reservoir pressure in the valve chamber 17 is reduced by flow of fluid under pressure therefrom to the brake cylinder device slightly below that in the brake pipe 4, the diaphragm 12 will deflect downwardly toward the lower pressure and move the auxiliary slide valve 26 relative to the main slide valve 23 until the shoulder 24 on stem 21 engages the main slide valve. This engagement will prevent further downward movement of the diaphragm 12 and auxiliary slide valve 26 at this time and defines what is commonly known as service lap position in which the auxiliary slide valve 26 laps the service port 124 to thereby prevent further flow of fluid under pressure from the auxiliary reservoir to the brake cylinder device 11 and thereby limit the pressure of fluid obtained therein in acordance with the reduction in brake pipe pressure.

If a further service reduction in pressure is effected in brake pipe 4, the diaphragm 12 will move the auxiliary slide valve 26 first to service position and then to lap position to provide a corresponding increase in pressure in the brake cylinder device 11, as will be apparent from the above description, it being noted that the quick service venting of fluid under pressure from the brake pipe upon the reduction of brake pipe pressure effected to increase the degree of brake application will be limited to that amount which has been vented from the quick service volume 81 by way of choke 82 prior to additional brake pipe reduction being effected.

*Release of brakes after a service application*

In order to release the brakes from a car after a service application, the pressure of fluid in brake pipe 4 will be restored in the usual manner. When the brake pipe pressure in chamber 13 of service application valve device 5 is thus increased sufficiently over auxiliary reservoir pressure in chamber 17, the diaphragm 12 will deflect downwardly and move the slide valves 26 and 23 from service lap position to a release position in which they are shown in the drawing. With restricted port 114 and port 115 in the auxiliary and main slide valves 26, 23, respectively, now in registration and reopened to the emergency reservoir passage 65 in release position, fluid under pressure from the emergency reservoir 3 will flow at a restricted rate to valve chamber 17 and the auxiliary reservoir 2, but such flow will be relatively insignificant and will not reduce emergency reservoir pressure nor increase auxiliary reservoir pressure significantly. As previously noted, in release position port 115 will also register with passage 102, which connection becomes important at this time. Fluid under pressure in emergency reservoir 3 will now flow without restriction through passage 65, port 115 and passage 102 to chamber 101 where it will act on diaphragm 100 to preponderate over auxiliary reservoir pressure in chamber 19, which auxiliary reservoir pressure having been reduced in effecting a brake application.

In response to a preponderance of pressure in chamber 101 over that in chamber 19 and the spring 108, diaphragm 100 will deflect downwardly moving stem 104 to a position in which cavity 109 therein connects emergency reservoir passage 65 to brake pipe passage 14. A rapid flow of fluid under pressure from emergency reservoir 3 through passage 65, cavity 109, passage 14, strainer 15 and branch pipe passage and pipe 16 will then take place. This will cause a rapid local increase in pressure in the brake pipe 4 to substantial equalization of the pressures in the emergency reservoir 3 and the brake pipe 4, the point of equalization varying of course according to the degree of brake pipe pressure reduction. This accelerated service release of brakes will naturally occur first on the first car of the train where the increase in brake pipe pressure is initiated by the operator's automatic brake valve device on the locomotive, and the rapid local increase in the brake pipe pressure thus effected will cause back dump operation of the brake controlling valve device on the next car to the rear in the train and so travel serially from car to car back through the train. This back flow of fluid under pressure to the brake pipe from the emergency reservoir 3 will of course hasten the charging of the brake pipe and therefore the release of brakes after a service application.

At the same time, the brake pipe is again connected to valve chamber 17 by way of port 113 in the main slide valve 23 and fluid under pressure will flow from the brake pipe to the auxiliary reservoir by way of chamber 17 to charge said reservoir. With the slide valve 23 in release position fluid under pressure will flow from the brake cylinder device 11 to the retainer valve device 122 by way of passage and pipe 63, cavity 120, and passage 121. When the pressure of fluid in chamber 17 is restored to normal the pressure acting on opposite sides of diaphragm 100 will be substantially equal and spring 108 will operate to return diaphragm 100 and follower stem 104 to the position in which they are shown in the drawing, in which positions cavity 109 and connected brake pipe 4 will be again cut off from the emergency reservoir 3.

*Emergency application of brakes*

If it is desired to effect an emergency application of brakes, a sudden emergency reduction in pressure in brake pipe 4 will be initiated in the usual manner. In response to such reduction in brake pipe pressure, the service application valve device 5 will move to service position for supplying fluid under pressure from the auxiliary reservoir 2 to the brake cylinder device 11 the same as is effected by service application of the brakes. In the quick service and quick action chamber breather valve device 8 reduction of brake pipe pressure in diaphragm chamber 70 at an emergency rate will cause diaphragm 69 to deflect upward to a position in which a portion of a follower stem 74 engages the casing, in which position quick service venting will be effected through ports 79 and 80 and quick action chamber venting will be effected through ports 85 and 86. This venting, however, will be at a slower rate than that established in the brake pipe and consequently the diaphragm 69 will remain in its upward position as just described. While some fluid under pressure may be vented from the brake pipe through said communications, such venting is immaterial and not necessary because of emergency venting of the brake pipe by operation of the emergency application valve device 6, as will now be described.

Upon an emergency reduction in pressure in brake pipe 4 and hence in diaphragm chamber 31 of the emergency application valve device 6, a differential will promptly be established between quick action chamber pressure on the upper side and brake pipe pressure on the lower side of diaphragm 27 which will move said diaphragm and the follower stem 32 downwardly. Since the flow capacity of vent port 86 is limited by a choke 125 to a service rate of reduction of quick action chamber 30 and fluid under pressure in the quick action chamber cannot be equalized with brake pipe pressure in passage 14 through choke 112 by reason of its restriction, a sufficient differential of pressure will be established on diaphragm 27 by the brake pipe reduction to move said diaphragm and follower stem 32 to an emergency position, defined by engagement with the casing of a portion of the clamping means 33 disposed in chamber 31, and the bottom of piston stem 32 with another portion of said casing. In this emergency position the cavity 34 in the follower stem 32 will connect passage 29 to passage 39 and fluid under pressure in quick action chamber 30 will then flow to diaphragm chamber 41 of the vent valve device 7 by way of passage 29, cavity 34, and passage 39.

Fluid under pressure thus supplied to chamber 41 will promptly deflect diaphragm 40 downwardly to effect through the medium of a stem 47 the unseating of the vent valve 48, whereupon a sudden venting of fluid under pressure from brake pipe 4 by way of passage 16, chamber 15, and passage 14 will occur to thereby transmit the emergency reduction in brake pipe pressure to the brake controlling valve device on the next car to the rear in the train and then serially from car to car throughout the length of the train, in the usual manner.

Fluid under pressure supplied to passage 39 by operation of the emergency application valve device 6, as previously described, will also flow to chamber 60 in high pressure valve device 10. With the pressure of fluid in chamber 61 at the underside of high pressure piston valve 59 being reduced at an emergency rate of reduction through passage 14, quick action chamber pressure in chamber 60 will promptly move said piston valve downwardly to its high pressure position defined by engagement with the casing, whereupon fluid under pressure will flow from the emergency reservoir 3 through passage 65 and cavity 62 to brake cylinder passage and pipe 63 which at the same time is being supplied with fluid under pressure from the auxiliary reservoir 2 by way of the service application valve device 5.

The fluid under pressure supplied from the quick action chamber 30 to chambers 60 and 41 for operation of the emergency high pressure piston valve 10 and vent valve device 7, respectively, will be gradually dissipated via passage 39 and the chamber 41 through a passage 126, a choke 127, passage and chamber 53, passage 52 in the stem 47 and vent passage 43 to atmosphere. A parallel communication from chamber 41 to passage 52 may be established by way of passage 58 and port 57, which may reduce the blow-down time by a degree determined by flow capacity of a choke to be inserted in a socket 128 in the casing. In any event the capacity of said choke will be such that piston valve 59 will remain in its high pressure position for a sufficient period of time to insure full equalization of the pressure of fluid in the emergency reservoir 3 into the auxiliary reservoir 2 and brake cylinder device 11, while the vent valve 48 will remain open long enough to insure complete venting of fluid under pressure from the brake pipe 4 and thereby an emergency application of brakes on all cars of the train.

At the expiration of this time period, spring 51 will seat the vent valve 48 so that the brake pipe may be recharged whenever desired to effect release of the emergency application of brakes. However, after seating of the vent valve 48, venting of fluid under pressure from the chamber 72 in device 8, chamber 28 in device 6, and quick action chamber 30 will continue to flow to the atmosphere via passage 29, emergency valve cavity 34, passages 39, 58, 126 and 43 as previously traced, until the pressures in these chambers are reduced to atmospheric pressure to facilitate a release of brakes after an emergency application.

Upon reduction in pressure in chamber 28 of emergency application valve device 6 to that of the atmosphere, the spring 35, in acting on clamping means 33, will return the follower stem 32 to the position in which it is shown in the drawing, blanking off passage 39 from passage 29, in preparation for subsequent activity when called for.

Release of brakes after an emergency application

To effect a release of the brakes after an emergency application, fluid under pressure is supplied to the brake pipe 4 and flows to diaphragm chamber 13 in the service valve device 5, valve chamber 31 in the emergency application valve device and diaphragm chamber 70 in the breather valve device 8. Fluid in valve chamber 17 of the service application valve device 5 being at reduced auxiliary reservoir pressure at this time, the parts of said device will remain in service position until the opposing brake pipe pressure acting on the diaphragm 12 is increased slightly over the pressure in valve chamber 17.

Fluid under pressure being supplied to brake pipe 4 will also flow to chamber 61 in the high pressure valve device 10 and act on piston valve 59 to move it upwardly against the presently atmospheric pressure in chamber 60 to the position shown in Fig. 1 of the drawings, in which position chamber 62 will be disconnected from the emergency reservoir passage 65 and therefore communication between emergency reservoir and brake cylinder pipe 63 will be cut off.

As fluid under pressure is being supplied from brake pipe 4 to the diaphragm chamber 70 in the breather valve device 8, fluid will also flow from brake pipe passage 14 through choke 112 to the quick action chamber 30 and to the valve chamber, and thence by way of passage 73 to valve chamber 72, both of which chambers were completely vented in effecting an emergency application of the brakes. The flow capacity of choke 112, however, is so small with respect to the relatively rapid rate of increase in brake pipe pressure in diaphragm chamber 70 that a sufficient differential of pressure will be promptly obtained on diaphragm 69 to deflect said diaphragm together with follower stem 75 downward until the stem contacts the back dump piston valve 87 and then moves said piston valve against the force of spring 89 into contact with the casing, thereby defining a back dump position. In this back dump position, annular cavity 92 connects brake cylinder passage 93 to back dump passage 94, movement to which may occur at a time when the pressure in the auxiliary reservoir 2 and brake cylinder device 11 is approximately 65 pounds, said reservoir being opened to said brake cylinder device through the port 124 in the service application valve device 5 in service position. As a result, the instant that cavity 92 connects passages 93 and 94, a rapid flow of fluid under pressure from the auxiliary reservoir 2 and the brake cylinder device 11 will be effected by way of said cavity and thence past check valve 95 and through chamber 97, passage 14, strainer 15, and passage and branch pipe 16 to the brake pipe 4. This will cause a rapid local increase in pressure in the brake pipe 4 to substantial equalization of pressures in auxiliary reservoir 2 and the brake cylinder device 11 with the brake pipe at perhaps 40 to 45 pounds. This back dump operation will naturally occur first on the first car of the train when the increase in brake pipe pressure is initiated by the operator's automatic brake valve device on the locomotive, and the rapid local increase in brake pipe pressure thus effected will cause back dump operation of the brake controlling valve device on the next car to the rear in the train and so travel serially from car to car through the train. This back dumping of fluid under pressure to the brake pipe from brake cylinder device 11 saves fluid which would otherwise be merely vented to atmosphere to effect a release of brakes and be thereby lost. It also hastens charging of the system for release of brakes after an emergency application and also reduces the pressure in the auxiliary reservoir 2 to a relatively low degree and thereby hastens the realization of a preponderance of brake pipe pressure in chamber 13 over auxiliary reservoir pressure in chamber 17 necessary to cause the diaphragm 12 of the service brake application valve device 5 to move the parts thereof to their brake release position.

After termination of the back dump operation, the continued supply of fluid under pressure to brake pipe 4 will continue to increase the pressure of fluid in diaphragm chambers 13 and 70. When the pressure in chamber 13 is thus increased sufficiently over the reduced auxiliary reservoir pressure in chamber 17, the diaphragm 12 will return the slide valves 23 and 26 to release position in which the auxiliary reservoir 2 will release position in which the auxiliary reservoir 2 will be disconnected from the brake cylinder device 11 and said brake cylinder device will be vented to atmosphere by way of cavity 120, passage 121 and retaining valve device 122 as previously described. Also, the emergency reservoir 3 will be opened through passage 65, port 115 in the main slide valve 23, and passage 102 to chamber 101 in the accelerated service release valve device 9. Since emergency reservoir 3 has been previously cut off from brake cylinder passage 63 by operation of the high pressure valve 59 in effecting a release of brakes after an emergency application, as just described, and thereafter brake cylinder device 11 and auxiliary reservoir 2 were equalized with the brake pipe 4, which was initially at atmospheric pressure, emergency reservoir pressure in chamber 101 will prevail over the reduced auxiliary reservoir pressure in chamber 19, causing diaphragm 100 to move piston valve 105 to its quick release position as previously described in which fluid under pressure in emergency reservoir 3 will flow to brake pipe passage 14 by way of cavity 109 in said piston valve, causing such accelerated service release valve device 9 to operate in the same manner as previously described in connection with a release of a service application of the brakes. Also, the emergency reservoir 3 will be opened through the port 115 in the main slide valve 23 and port 114 in the auxiliary slide valve 26 to valve chamber 17 and thereby to the auxiliary reservoir 2 to permit recharging of said chamber and reservoir with fluid under pressure from the emergency reservoir to equalization of pressures of fluid therein. At this time pressures will be equalized on diaphragm 100 and spring 108 will be operative to move piston valve 105 upwardly to the position in which it is shown in the drawing. Final charging of the auxiliary reservoir 2 and emergency reservoir 3 to normal brake pipe pressure will occur from the brake pipe 4 by way of choke 123 in the same manner as in initial charging.

In the emergency application valve device 6 the chamber 38 and quick action chamber 30 become gradually charged with fluid under pressure from the brake pipe passage 14 by way of the choke 112 while the pressure in chambers 31 and 38 becomes increased at a relatively rapid rate by flow directly from such brake pipe passage 14, with the result that such emergency application valve device 6 will remain in the position in which it is shown in the drawing and which it was caused to assume when quick action chamber pressure in chamber 28 became reduced to atmosphere during the effecting of the emergency application of brakes, as previously described. As chamber 28 and quick action chamber 30 become gradually charged with fluid under pressure supplied from the brake pipe passage 14 through choke 112 to normal brake pipe pressure, spring 35 will continue to maintain diaphragm 27 and follower stem 32 positioned as shown in Fig. 1.

In the breather valve device 8 the piston valve 87 will maintain its cavity 92 positioned for registry with brake cylinder passage 63 until quick action chamber pressure in chamber 72 approaches brake pipe pressure in chamber 70, whereupon, said piston valve, together with stems 74, 75 and slide valves 77, 83 will be returned to their respective positions in which they are shown in Fig. 1 by action of the spring 89.

The modification shown in Fig. 2 differs from the embodiment of the invention shown in Fig. 1 in that the high pressure piston valve 59 including cavities 62 and 64 is integrally attached to stem 32 of device 6 for operation by the diaphragm 27. As in Fig. 1 cavity 62 serves to connect emergency reservoir passage 65 to brake cylinder passage 63 while cavity 64 is carried out of registry with passages 65 and 116, upon operation of the emergency valve device 6 to emergency position. As in Fig. 1, upon venting of quick action chamber 30 to atmosphere by way of vent valve device

Description of modification shown in Fig. 2

7, spring 35 will return diaphragm 27 and follower stem 32 to the position shown in Fig. 2. In brief, by attaching the high pressure piston valve 59 of Fig. 1 integrally to the follower stem 32, the elimination of chambers 38 and 60 in the embodiment of Fig. 1, is accomplished.

Description of modification shown in Fig. 3

The embodiment shown in Fig. 3 differs functionally from that shown in Fig. 1 in that the functions of both the high pressure valve device 10 and vent valve device 7 are controlled by operation of the emergency valve diaphragm 27, and also, in that an improved combined reservoir and brake cylinder release valve device 131 has been added to supply optional local control of the brakes on a car after the brake pipe has been vented to atmosphere.

In the embodiment of the invention shown in Fig. 3 the service application valve device 5 will effect supply and release of fluid under pressure to and from the brake cylinder device 11 by way of a brake cylinder passage 168 connected, in lieu of brake cylinder passage 63, in proximity to the vent passage 121 for control by the slide valve 23 in manner as previously described with respect to operation of said device 5 in connection with the brake cylinder passage 63 in the embodiment shown in Fig. 1. As will be apparent from subsequent description, brake cylinder passage 168 is in constantly open communication with the brake cylinder passage 63 and thereby with the brake cylinder device 11.

In Fig. 3 there is shown an emergency application valve device 132, which includes the diaphragm 27 having at one side the chamber 28, which is opened through passage 29 to quick action chamber 30 and at the other side chamber 31, which is opened to brake pipe passage 14, all of which are shown in Fig. 1. Secured to the center of diaphragm 27 by suitable clamping means 133 is a follower 134 having an upper stem 135 extending through chamber 28 and a lower stem 136 extending through chamber 31. The lower stem 136 extends downwardly from chamber 31 through an axial bore 137 in a high pressure valve 138, a chamber 139 at the lower side of said valve and a suitable opening in a partition wall 140 into a chamber 141 which is open to atmosphere by way of a vent passage 142. In chamber 141 the lower end of the stem 136 is disposed adjacent a vent valve 143, contained in a chamber 144 which is open to branch pipe 16 and also contains a spring 145, which normally holds said valve in a position closing communication between chambers 141 and 144. The high pressure valve 138 is provided with an annular cavity 146 which is always open to brake cylinder passage 168 and may during an emergency brake application connect said passage to emergency reservoir passage 65 for the purpose of increasing brake cylinder pressure. Valve 138 is further provided with a sealing ring 147 for preventing leakage of fluid under pressure between chamber 31 and cavity 146, a pair of sealing rings 148 for preventing leakage of fluid under pressure from an annular cavity 149 normally connecting passages 116 and 65, and a sealing ring 150 for preventing leakage of fluid under pressure from chamber 139 to atmospheric chamber 141. It should here be understood that the follower stem 136 is smaller in diameter than is the bore 137 to permit free flow of fluid under pressure between chambers 31 and 139 and to permit free movement of said stem relative to valve 138 within certain limits.

In operation, therefore, when a reduction in brake pipe pressure is made at an emergency rate, diaphragm 27 will deflect downwardly, as previously described, carrying lower follower stem 136 downwardly into the contact with said valve 143 first and then forcing same from its seat against brake pipe pressure and spring 145 in chamber 144. Follower stem 136 will continue to move downwardly thereafter until a shoulder 151 formed thereon engages the high pressure valve 138 and will then move it downwardly to a position in which cavity 146 will register with passages 168 and 65, thereby connecting emergency reservoir pressure to brake cylinder passage 63. Unseating of vent valve 143 will vent branch pipe 16 and thereby brake pipe 4 to atmosphere by way of branch pipe 16, chambers 144 and 141, and atmospheric passage 142, to thereby transmit the emergency rate of reduction in brake pipe pressure to the next car to the rear in the train. The venting of quick action chamber 30 to atmosphere will occur by way of passage 29, and chamber 28, a choke 152, a passage 153, a port 154 and a longitudinal passage 155 in stems 135 and 136, chamber 141 and vent passage 142.

The registration of port 154 for a restricted flow of quick action chamber pressure to atmosphere will occur at the time of unseating of vent valve 143, since the resistance to movement of diaphragm 27 will be greatly reduced by said unseating. Upon complete downward movement of follower 134 being effected, as defined by contact of a snap ring 156 for a washer 157 with the casing, port 154 will be opened to chamber 28 while the upper end of stem 135 will uncover a passage 158 to passage 155, in which flow may be unrestricted according to conditions by a suitable choke placed in a socket 159.

When the pressure of fluid in chamber 28 has been reduced to atmospheric pressure by the means just described, the spring 145 in chamber 144 will actuate the vent valve 143, stems 136, 134 and high pressure valve 138 upwardly with corresponding deflection of diaphragm 27 until said vent valve assumes its seated position in which it is shown in the drawing. Upon subsequent restoration of brake pipe pressure in chamber 31, diaphragm 27 will further deflect upwardly carrying with it follower stems 135, 136 and, through the medium of washer 157, the high pressure valve 138 to the positions in which they are shown in the drawing.

In summary, during operation of device 132 it will be apparent that the full effect of quick action chamber pressure will be utilized to unseat the vent valve 143 against opposition of brake pipe pressure in chambers 139 and 144, which brake pipe pressure quickly becomes reduced to that of the atmosphere as a result of such unseating. With the brake pipe pressure opposition to downward movement of vent valve 143 thus eliminated, quick action chamber pressure becomes effective to actuate the high pressure valve 138 to its emergency application position merely against opposition of the spring 145 and slight friction of the sealing rings.

The brake cylinder release and reapplication valve device 131 comprises a brake cylinder exhaust valve portion 160, a reservoir release valve portion 161 and a brake cylinder reapplication valve portion 162. The brake cylinder exhaust valve portion 160 comprises a diaphragm 163 secured at its periphery between two sections of the casing and having at one side a control chamber 164 connected through a passage 165 to a cavity 166 in the reapplication valve portion 162. At the other side of said diaphragm 163 is a chamber 167 which is in constant communication with the service application valve device 5 through the brake cylinder supply passage 168 and is normally open to the brake cylinder device 11 by way of a passage 169 and brake cylinder passage 63. Contained in chamber 167 is a follower stem 170 clamped at its upper end to the center of diaphragm 163 and provided at its lower end with a brake cylinder vent valve 171 adapted to respond to pressure of a spring 172 to close connection between passage 169 and an atmospheric vent port 173. Adjacent the lower end of follower stem 170 is an annular cavity 174 defined in part by a pair of annular ribs 175 formed on said stem and opened at all times to passage 121 leading to the retaining valve device 122 and adapted to connect passage 169 to passage 121 in a brake cylinder release position of said stem so as to reduce any fluid pressure retained in retaining valve device 122 to atmospheric pressure when releasing the brakes. A sealing ring 176 is mounted in the periphery of each of annular ribs 175 for preventing leakage of fluid under pressure from cavity 174.

The reservoir release valve portion 161 comprises three lift valves 177, 178, 179 operably mounted in chambers 180, 181, 182 and urged toward their seated positions by springs 183, 184 and 185, respectively, in which positions communications between their respective chambers and a chamber 186, open to atmosphere through vent ports 187, are closed. The chamber 180 is open to auxiliary reservoir 2 by way of a passage 188 and passage and pipe 20 and chamber 182 is connected to emergency reservoir 3 by way of a passage 189 and passage and pipe 65, while chamber 181 is connected to cavity 166 in the reapplication valve portion 162 by way of a passage 190. The valves 177, 178 and 179 are adapted to be unseated by stems 191, 192 and 193, respectively, upon upward movement of a carrier member 194 in which said stems are originally mounted, against a spring 195, in response to rocking of a handle 196. The relative length of the stems are such that valve 178 will be unseated first, followed by valve 177 and then valve 179, in the order named.

The brake cylinder reapplication valve portion 162 comprises a diaphragm 197 clamped about its periphery between two sections of the casing having at one side a chamber 198 open to brake pipe 4 by way of a passage 199, passage 14, strainer 15, and branch pipe 16, and at the other side a chamber 200 open to atmosphere through a vent port 201. Secured to the center of diaphragm 197 by suitable clamping means 202 is a follower stem 203 slidably mounted in a suitable bore in the casing and having the chamber 200 at its upper end and a chamber 204 at its lower end, the latter being open to atmosphere through a vent port 205. Intermediate its ends stem 203 is provided with the annular cavity 166 which, with stem 203 in the position in which it is shown, connects chamber 164 to chamber 181 so that chamber 164 will be vented to atmosphere when valve 178 is unseated by stem 192 as mentioned above. The stem 203 is also provided with an annular cavity 206, which is adapted to connect passage 168 to passage 165 in effecting a reapplication of the brakes. A spring 207 contained in chamber 204 is adapted to urge stem 203 upwardly into contact with a yieldable stop and spring cage 208, pressed toward the position shown in Fig. 3 by a spring 209. The relative value of springs 209 and 207 are such that an upward force exerted on handle 210 will be transmitted upwardly through spring 207 against stop 208 to compress spring 209, as described below.

In operation, when chamber 198 is charged with fluid under pressure supplied from brake pipe 4, as previously described, diaphragm 197 will deflect downwardly, moving follower stem 203 downwardly to compress spring 207 to a position in which passage 190 will be connected to chamber 200 which, it will be noted, is open to atmosphere through vent port 201. Consequently, the valve 178 will have atmospheric pressure on both sides so that movement of handle 196 to unseat valve 178 will not effect a release of the car brakes as long as the brake pipe is charged. If so desired, however, further rocking movement of handle 196 will first unseat the lift valve 177 to vent fluid under pressure from auxiliary reservoir 2 and to unseat valve 179 to vent fluid under pressure from emergency reservoir 3. With the valve 177 unseated fluid under pressure in auxiliary reservoir 2 may flow to atmosphere by way of passages 20 and 188, chamber 180, past check valve 177 into chamber 186 and thence to atmosphere by way of vent ports 187. With valve 179 unseated fluid under pressure in emergency reservoir 3 may flow to atmospheric chamber 186 by way of passages 65 and 189, and chambers 182 and 186.

When a car is set out on a railway siding in a yard, the brake pipe 4 will as a matter of course be vented to atmosphere and an emergency application of the car brakes effected thereby. If it is desired to repair or move the car to another location without the use of automatic fluid pressure brakes and using the manually operated brake only, the car brakes may be released by rocking the handle 196 and may be reapplied after the car has been relocated by pushing the handle 210 inward. Upon brake pipe 4 being vented to atmosphere, connected chamber 198 will also be vented whereupon diaphragm 197 will be moved to the position shown in Fig. 3 by action of spring 207, and cavity 166 in follower stem 203 will again connect passages 190 and 165. Movement of handle 196 sufficient to unseat valve 178 only will therefore permit fluid under pressure in chamber 164 to flow to atmosphere through passage 165, cavity 166, passage 190, chamber 181 and atmospheric chamber 186. A choke 211 interposed between passages 165 and 169 will prevent flow of fluid under pressure from chamber 167 to atmosphere at a rate of flow equal to that from chamber 164, so that the pressure of fluid in the brake cylinder device 11 will be active in chamber 167 on the lower side of diaphragm 163 while the pressure of fluid in chamber 164 will be reduced to atmosphere. When the differential of pressure in chamber 167 over that in chamber 164 becomes great enough to overcome spring 172, diaphragm 163 and follower stem 170 will move upwardly to a position defined by contact of said follower with the casing, in which position vent valve 171 will be unseated to permit fluid under pressure in brake cylinder device 11 to flow to atmosphere by way of passage 169 and port 173. At the same time chamber 167 will be cut off from passage 169 and cavity 174 will connect passage 121 to passage 169 so that any fluid which may be retained in the brake cylinder device 11 at a predetermined pressure by the retaining valve device 122 may likewise be vented to atmosphere by way of vent valve 171.

When it is desired to reapply the brakes, the operator may push the handle 210 inward. By reason of spring 207 being stronger than spring 209, follower stem 203 will move upward against spring 209 to a position in which cavity 206 will connect brake cylinder supply passage 168 to passage 165.

With the service application valve device 5 being in application position at this time, said valve will operate to supply fluid under pressure from auxiliary reservoir 2 to passageway 168, which fluid under pressure will flow via cavity 206 to passageway 165 thence to chamber 164, in response to which diaphragm 163 will move follower stem 170 downward to its normal position shown in Fig. 3. With vent valve 171 seated, fluid under pressure supplied to passage 168 will flow to brake cylinder device 11 by way of chamber 167 in device 131, passage 169 and the pipe 63. With the chamber 167 thus charged with fluid under pressure, the device 131 is again prepared for a manual brake cylinder release when and if desired.

Summary

From the foregoing it will be seen that with this invention we have provided an improved fluid pressure brake equipment for railway vehicles having a novel combined breather valve device for discharging brake pipe pressure fluid into a quick service volume and also venting an emergency valve quick action chamber to atmosphere simultaneously for providing greater stability during a quick service operation in service operation, together with a novel quick release valve device operative upon movement of a service application valve device to release position to connect the previously isolated emergency reservoir to accelerate the charging of the brake pipe and release the brakes on cars further to the rear of the train, and in addition an improved manually operable release and reapplication valve device operable only when the brake cylinder pressure has been reduced below a predetermined low degree to effect a release of the brake cylinder device while retaining the reservoir fluid under pressure for manually effecting a subsequent reapplication of the brake cylinder device.

Having now described the invention, what we claim as new and desire to secure by Letters Patent is:

1. In a fluid pressure brake equipment, in combination, a brake pipe, an auxiliary reservoir, an emergency reservoir, fluid pressure operable brake applying means, a quick service reservoir, a quick action chamber normally charged at a restricted rate with fluid under pressure from said brake pipe, a service application valve means operative upon a service rate of reduction of brake pipe pressure to supply fluid under pressure from said auxiliary reservoir to said brake applying means and upon a restoration of brake pipe pressure to release fluid under pressure from said brake applying means to atmosphere, a combined quick service and quick action chamber breather valve device comprising a first movable abutment subject on one side to brake pipe pressure and on the other side to quick action chamber pressure, a quick service valve operable by said first movable abutment upon a reduction in brake pipe pressure to connect said brake pipe to said quick service reservoir for effecting a local quick service reduction in brake pipe and a breather valve operable by the same movement of said first movable abutment to simultaneously vent fluid under pressure from said quick action chamber to atmosphere, and an emergency application valve device comprising a second movable abutment subject to the opposing pressures of fluid in said brake pipe and said quick action chamber and valve means operable by said second movable abutment means upon a reduction in brake pipe pressure at an emergency rate to an emergency position for causing local venting of brake pipe to atmosphere and connecting said emergency reservoir to said brake applying means, back dump means comprising valve means operable by said first movable abutment in response to a predetermined excess of brake pipe pressure over quick action chamber pressure to a position for supplying fluid under pressure from said brake cylinder device to said brake pipe for accelerating the release of brakes through the train after an emergency application, a quick release valve device comprising a flexible diaphragm subject at one side to auxiliary reservoir pressure, said service application valve means being operative in release position to connect emergency reservoir to the opposite side of said diaphragm to said one side and in application position to connect said opposite side to atmosphere, and valve means operative by said flexible diaphragm upon a preponderance of emergency reservoir pressure at said opposite side over auxiliary reservoir pressure at said one side to connect emergency reservoir to brake pipe to accelerate release of brakes in other cars in the train, independent brake release and reapplication means interposed in a passageway leading from said service application valve means to said brake applying means selectively operative after said emergency brake application valve device means has supplied fluid under pressure to said brake applying means to effect release of fluid under pressure from said brake applying means and resupply fluid under pressure to same while said emergency brake application means remains in emergency brake application position and comprising vent valve means subject on one side to pressure of fluid supplied to said passageway, flow restricting means connecting said passageway to the other side of said vent valve means, independent brake release means manually operable to open a connection from said other side to atmosphere, brake reapplication means having a normal position for establishing said connection, resilient means manually operable for actuating said brake application means in one direction from said normal position to a reapplication position in which said connection is closed and said independent brake release means is connected to atmosphere and said passageway is connected to said brake applying means, and fluid pressure responsive means operative in response to brake pipe pressure to actuate said reapplication means against said resilient means to another position in which said connection is closed and said independent release means is vented to atmosphere for rendering same ineffective.

2. In a fluid pressure brake equipment, in combination, a brake pipe, an auxiliary reservoir, a service valve mechanism subject to opposing pressures of the brake pipe and auxiliary reservoir to effect service operations of the brake, a quick action chamber normally charged with fluid under pressure from said brake pipe, an emergency valve mechanism subject to opposing pressures of the brake pipe and quick action chamber to effect emergency operations of the brake, and a breather valve device comprising a movable abutment subject on one side to brake pipe pressure and on the other side to fluid pressure in said chamber, quick service valve means operative by said movable abutment upon a reduction in brake pipe pressure at a rate not greater than a service rate on the one side to establish a communication through which fluid under pressure is adapted to be vented from the brake pipe to effect a local quick service reduction in brake pipe pressure and being operative by said movable abutment upon a reduction in fluid pressure in said chamber on the other side to close said communication, and quick action chamber breather valve means operative by said movable abutment upon the same reduction in brake pipe pressure to simultaneously vent fluid under pressure from said chamber to atmosphere to match any rate of reduction in brake pipe pressure less than an emergency rate.

3. In a fluid pressure brake equipment, in combination, a brake pipe, an auxiliary reservoir, a service valve mechanism subject to opposing pressures of the brake pipe and auxiliary reservoir to effect service operations of the brake, a quick action chamber normally charged with fluid under pressure from said brake pipe, and a breather valve device comprising a movable abutment subject on one side to brake pipe pressure and on the other side to fluid pressure in said chamber, quick service valve means operative by said movable abutment upon a reduction in brake pipe pressure at a rate not greater than a service rate on the one side to establish a communication through which fluid under pressure is adapted to be vented from the brake pipe to effect a local quick service reduction in brake pipe pressure and being operative by said movable abutment upon a reduction in fluid pressure in said chamber on the other side to close said communication, and quick action chamber breather valve means operative by said movable abutment upon the same reduction in brake pipe pressure to simultaneously vent fluid under pressure from said chamber to atmosphere to match any rate of reduction in brake pipe pressure less than an emergency rate, a vent valve device comprising a second movable abutment and valve means operable thereby in response to fluid pressure supplied to said second movable abutment to vent brake pipe to atmosphere at an emergency rate, a third movable abutment operable in response to fluid pressure supplied thereto to effect application of the brakes in degree additional to that obtained by operation of said service valve mechanism, and an emergency application valve device comprising a fourth movable abutment subject at one side to brake pipe pressure and at the other side to fluid pressure in said quick action chamber and valve means operable thereby in response to a reduction in brake pipe pressure at an emergency rate to connect said quick action chamber to said second and third movable abutments.

4. In a fluid pressure brake equipment, in combination, a brake pipe, a quick action chamber normally charged with fluid under pressure from said brake pipe at a restricted rate, a quick service reservoir, brake controlling means operative upon a service rate of reduction to effect a service application of the brakes, a breather valve device comprising a movable abutment subject on one side to brake pipe pressure and on the other side to fluid pressure in said quick action chamber, quick service valve means operative by said movable abutment upon a reduction in brake pipe pressure to establish a communication through which a quick service reduction of brake pipe may be effected, quick action breather valve means operative by said movable abutment upon the same reduction in brake pipe pressure to simultaneously vent fluid under pressure from said chamber to atmosphere to match any rate of brake pipe reduction less than an emergency rate, an emergency application valve means operative upon an emergency rate of reduction in brake pipe pressure to effect an emergency application of the brakes, said emergency application valve means comprising vent valve means having a second movable abutment and valve means operable thereby in response to fluid pressure to vent brake pipe to atmosphere at an emergency rate, and an emergency application mechanism comprising a third movable abutment subject at one side to brake pipe pressure and at the other side to fluid under pressure in said quick action chamber and valve means operable thereby in response to a reduction in brake pipe pressure at an emergency rate to connect said chamber to said second movable abutment, and high pressure valve means responsive to the pressure of fluid supplied to said second movable abutment to effect an emergency application of the brakes.

5. In a fluid pressure brake equipment, in combination, a brake pipe, a quick action chamber normally charged with fluid under pressure from said brake pipe at a restricted rate, a quick service reservoir, brake controlling means operative upon a service rate of reduction to effect a service application of the brakes, a breather valve device comprising a movable abutment subject on one side to brake pipe pressure and on the other side to fluid pressure in said quick action chamber, quick service valve means operative by said movable abutment upon a reduction in brake pipe pressure to establish a communication from said brake pipe to said quick service reservoir through which a quick service reduction of brake pipe may be effected, quick action breather valve means operative by said movable abutment upon the same reduction in brake pipe pressure to simultaneously vent fluid under pressure from said chamber to atmosphere to match any rate of brake pipe reduction less than an emergency rate, an emergency application valve means operative upon an emergency rate of reduction in brake pipe pressure to effect an emergency application of the brakes, said emergency application valve means comprising vent valve means having a second movable abutment and valve means operable thereby in response to fluid pressure supplied to said second movable abutment to vent brake pipe to atmosphere at an emergency rate, and an emergency application mechanism comprising a third movable abutment subject at one side to brake pipe pressure and at the other side to fluid under pressure in said quick action chamber and valve means operable thereby in response to a reduction in brake pipe pressure at an emergency rate to connect said chamber to said second movable abutment, and high pressure valve means comprising a fourth movable abutment subject at one side to brake pipe pressure and at the other side to pressure of fluid supplied to said second movable abutment and valve means operative upon operation of said third movable abutment to effect a degree of brake application additional to that obtained by operation of said brake controlling means.

6. In a fluid pressure brake apparatus, in combination, a brake pipe, fluid pressure operable brake applying means, a fluid pressure supply reservoir, brake controlling means operable upon a reduction in brake pipe pressure to atmospheric pressure to supply fluid under pressure from said reservoir to a brake cylinder passageway for conveyance of such fluid under pressure to said brake applying means, independent brake release means operative, after said brake controlling means has supplied fluid under pressure to said brake applying means, to release fluid under pressure from said brake applying means independently of said brake controlling means, said brake release means comprising a movable abutment subject on one side to pressure of fluid in said brake cylinder supply passageway, flow restricting means connecting said brake applying means to a control chamber exposed to the other side of said movable abutment means, vent valve means positively connected to said movable abutment having a normal position in which said brake cylinder passageway is open to said brake applying means and operable by said movable abutment in response to a reduction in fluid pressure in said control chamber to a brake release position in which said brake cylinder passageway is thereby closed off from said brake applying means and said brake applying means is opened to atmosphere, resilient means biasing said abutment and said vent valve means toward said normal position, a brake release valve means manually operable to vent fluid under pressure from said control chamber to atmosphere by way of a conduit, brake reapplication means having a normal position for establishing communication between said control chamber and said conduit, resilient means manually operable for actuating said brake reapplication means in one direction from said normal position to a reapplication position in which said conduit is connected to atmosphere and said brake cylinder passageway is connected to said brake applying means, and fluid pressure responsive means operative in response to brake pipe pressure to actuate said reapplication valve means against said resilient means to another position in which said conduit is vented to atmosphere for rendering said independent brake release means ineffective.

7. In a fluid pressure brake apparatus, in combination, a brake pipe, fluid pressure operable brake applying means, brake controlling valve means operable upon a reduction in brake pipe pressure to supply fluid under pressure to said brake applying means through a certain passageway, independent brake release and reapplication means operative, after said brake controlling valve means has supplied fluid under pressure to said brake applying means, to release fluid under pressure from said brake applying means independently of said passageway and said brake controlling valve means, said brake release and reapplication valve means comprising a movable abutment subject on one side to pressure of fluid in said passageway, flow restricting means connecting said brake applying means to a control chamber exposed to the other side of said movable abutment, vent valve means positively connected to said movable abutment having a normal position in which said passageway is open to said brake applying means and operable by said movable abutment in response to a reduction in fluid pressure on said other side to a brake release position in which said passageway is cut off from said brake applying means and said brake applying means is open to atmosphere, resilient means biasing said abutment and said vent valve means toward said normal position, a brake release valve means manually operable to vent fluid under pressure from said control chamber to atmosphere by way of a conduit, reapplication valve means interposed between said conduit and said control chamber and having a central position in which said conduit is connected to said control chamber, a pair of resilient means disposed respectively at opposite sides of said reapplication valve means urging same towards said central position, one of the resilient means being manually operable to actuate said reapplication valve means against force of the other resilient means to an inner position in which said conduit is connected to atmosphere and said passageway is connected to said control chamber, and diaphragm means operative in response to brake pipe pressure above a certain degree to actuate said reapplication valve means against the force of said one resilient means to an outer position in which said control chamber is disconnected from both said conduit and said passageway and said conduit is connected to atmosphere, whereby said brake release valve means is rendered incapable of effecting an independent brake release.

8. In a fluid pressure brake apparatus, in combination, a brake pipe, a brake cylinder device, brake controlling means operable upon a reduction in brake pipe pressure to supply fluid under pressure to said brake cylinder device through a supply communication, and a brake cylinder release and reapplication valve device comprising brake cylinder venting valve means for connecting said brake cylinder device to atmosphere upon a rapid reduction in pressure of fluid in a control chamber, a manual valve means for effecting said rapid reduction, interlock valve means having a normal position in which said manual valve means is in fluid communication with said venting valve means, a first resilient means urging said interlock valve means towards its normal position, diaphragm means operable in response to a predetermined degree of brake pipe pressure to move said interlock valve means against said resilient means to a position in which said manual valve means is cut off from said venting valve means and connected to atmosphere, reapplication valve means for controlling communication between said supply communication and said brake controlling means and said brake cylinder device having a normal position in which the last said communication is closed, another resilient means of lesser value than and acting in opposition to said one resilient means to hold said reapplication valve means in said normal position, and manual means operative through the medium of said one resilient means to actuate the latter said valve means against the other resilient means to a position in which said supply communication is connected to said brake cylinder device.

9. In a fluid pressure brake apparatus, in combination, a brake pipe, a brake cylinder device, brake controlling means operable upon a reduction in brake pipe pressure to supply fluid under pressure to a brake cylinder passageway for conveyance of such fluid under pressure to said brake cylinder device and operable upon subsequent restoration in brake pipe pressure to connect said brake cylinder device to a brake cylinder release port, a brake cylinder retaining valve device connected to said brake cylinder release port having a normal position in which said brake cylinder release port is connected directly to atmosphere and operable to a retaining position in which a certain degree of pressure is retained in said brake cylinder release port, an independent brake release and reapplication means operative after said brake controlling means has supplied fluid under pressure to said brake cylinder device, to release fluid under pressure from said brake cylinder device independently of said brake cylinder passageway and said brake controlling means, said brake release and reapplication means comprising a movable abutment subject on one side to pressure of fluid in said brake cylinder passageway, flow restricting means connecting said brake cylinder device to a control chamber exposed to the other side of said movable abutment, valve means positively connected to said movable abutment having a normal position in which said brake cylinder passageway is connected to said brake cylinder device and operable by said movable abutment in response to a reduction in fluid pressure in said control chamber to a brake release position in which said brake cylinder device is cut off from said brake cylinder passageway and said brake cylinder device and said retaining valve device are connected to atmosphere, resilient means biasing said abutment and said valve means towards said normal position, a brake release valve means manually operable to vent fluid under pressure from said control chamber to atmosphere by way of a conduit, brake reapplication means having a normal position for establishing communication between said control chamber and said conduit, resilient means manually operable for actuating said brake reapplication means in one direction from said normal position to a reapplication position in which said conduit is connected to atmosphere and said brake cylinder passageway is connected to said brake cylinder device, and fluid pressure responsive means operative in response to brake pipe pressure to actuate said reapplication valve means against said resilient means to another position in which said conduit is vented to atmosphere for thereby rendering said independent brake release means ineffective.

10. In a fluid pressure brake apparatus, in combination, a brake pipe, a brake cylinder device, an auxiliary reservoir, an emergency reservoir, service application valve means operative upon a service reduction in brake pipe pressure to an application position for connecting said auxiliary reservoir to said brake cylinder device and upon a restoration in brake pipe pressure to a release position for releasing fluid under pressure from said brake cylinder device and charging said reservoirs, emergency application valve means operative upon an emergency reduction in brake pipe pressure only to connect said emergency reservoir to said brake cylinder device, accelerated release valve means comprising a movable abutment subject to opposing pressures of fluid in a control chamber and said auxiliary reservoir, valve means operable by said movable abutment in response to a preponderance of pressure in said control chamber to a position to connect said emergency reservoir to said brake pipe, and valve means incorporated in said service application valve means connecting said control chamber to atmosphere in application position of said service application valve means and operable upon operation of said service application valve means to said release position to connect said emergency reservoir to said control chamber.

11. In a fluid pressure brake apparatus, in combination, a brake pipe, a brake cylinder device, an auxiliary reservoir, a service valve mechanism subject to opposing pressures of brake pipe and auxiliary reservoir operative upon a reduction in brake pipe pressure to connect auxiliary reservoir to said brake cylinder device to effect a service application of brakes, a quick action chamber normally charged with fluid under pressure from said brake pipe, valve means subject to opposing pressures in said brake pipe and said quick action chamber operable upon a reduction in brake pipe pressure at a service rate to vent quick action chamber to atmosphere at a rate corresponding to the rate of reduction in brake pipe pressure, an emergency reservoir, vent valve means comprising a movable abutment and valve means operable thereby in response to fluid under pressure supplied to said movable abutment to vent brake pipe to atmosphere at an emergency rate, flow restricting means for venting the last mentioned fluid pressure supply to atmosphere, and an emergency valve mechanism comprising a second movable abutment subject to opposing pressures of quick action chamber and brake pipe, and valve means positively connected to said second movable abutment operable therewith upon a reduction in brake pipe pressure at an emergency rate to an application position in which said quick action chamber is connected to said vent valve means and said emergency reservoir is connected to said brake cylinder device.

12. In a fluid pressure brake apparatus, in combination, a brake pipe, a brake cylinder device, an auxiliary reservoir, a service valve mechanism subject to opposing pressures of brake pipe and auxiliary reservoir operative upon a service reduction in brake pipe pressure to connect said auxiliary reservoir to said brake cylinder device to effect a service application of brakes, a quick action chamber normally charged with fluid under pressure from said brake pipe, valve means subject to opposing pressures in brake pipe and said quick action chamber operable upon a reduction in brake pipe pressure at a service rate to vent quick action chamber to atmosphere at a rate corresponding to the rate of reduction in brake pipe pressure, a vent valve for controlling communication of said brake pipe to atmosphere, resilient means urging said vent valve towards its normal seated position, and an emergency valve mechanism comprising a movable abutment subject to opposing brake pipe and quick action chamber pressures adapted to unseat said vent valve upon an emergency rate of reduction in brake pipe pressure, one valve means adapted to be operated by said movable abutment, after said vent valve is unseated, to connect said emergency reservoir to said brake cylinder device upon movement to unseat said vent valve, and another valve means operated by said movable abutment adapted to connect said quick action chamber to atmosphere at a restricted rate.

References Cited in the file of this patent

UNITED STATES PATENTS

| | | |
|---|---|---|
| 2,017,793 | Farmer | Oct. 15, 1935 |
| 2,038,164 | Cook | Apr. 21, 1936 |
| 2,383,242 | Down | Apr. 21, 1945 |